United States Patent
Wang et al.

(10) Patent No.: US 12,386,052 B2
(45) Date of Patent: Aug. 12, 2025

(54) REAL NUMBER SINE/COSINE WAVE BASIS FUNCTION TRANSFORM CIRCUIT

(71) Applicant: NATIONAL SUN YAT-SEN UNIVERSITY, Kaohsiung (TW)

(72) Inventors: Fu-Kang Wang, Kaohsiung (TW); Ju-Yin Shih, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 343 days.

(21) Appl. No.: 17/879,987

(22) Filed: Aug. 3, 2022

(65) Prior Publication Data

US 2023/0333235 A1    Oct. 19, 2023

(30) Foreign Application Priority Data

Apr. 18, 2022    (TW) .................................. 111114733

(51) Int. Cl.
| | |
|---|---|
| *G01S 13/58* | (2006.01) |
| *G01S 7/295* | (2006.01) |
| *G01S 7/40* | (2006.01) |

(52) U.S. Cl.
CPC ............ *G01S 13/581* (2013.01); *G01S 7/295* (2013.01); *G01S 7/40* (2013.01)

(58) Field of Classification Search
CPC .......... G01S 13/581; G01S 7/295; G01S 7/40; G01S 7/4021; G01S 7/415; G01S 7/282;
(Continued)

(56) References Cited

U.S. PATENT DOCUMENTS

| | | | |
|---|---|---|---|
| 7,242,729 B1 | 7/2007 | Heisternann et al. | |
| 2001/0001617 A1* | 5/2001 | Koga | ................... H04L 27/0012 375/334 |

(Continued)

FOREIGN PATENT DOCUMENTS

| | | | | |
|---|---|---|---|---|
| KR | 20200059131 A | * | 5/2020 | ........... A61B 5/7235 |

OTHER PUBLICATIONS

Byung-Kwon Park, Boric-Lubecke, O., & Lubecke, V. M. (2007). Arctangent Demodulation With DC Offset Compensation in Quadrature Doppler Radar Receiver Systems. IEEE Transactions on Microwave Theory and Techniques, 55(5), 1073â1079. https://doi.org/10.1109/TMTT.2007.895653 (Year: 2007).*

(Continued)

*Primary Examiner* — Vladimir Magloire
*Assistant Examiner* — Remash R Guyah
(74) *Attorney, Agent, or Firm* — Demian K. Jackson; Jackson IPG PLLC

(57) ABSTRACT

A real number sine/cosine wave basis function transform circuit includes a window segmentation element, a first transform element, a second transform element and a root-sum-square (RSS) element. The window segmentation element is provided to segment an in-phase output signal and a quadrature output signal to output an in-phase window signal and a quadrature window signal. The first and second transform elements are provided to transform the in-phase window signal and the quadrature window signal using a real number sine/cosine wave basis function to obtain a first transformed signal and a second transformed signal, respectively. The RSS element is provided to calculate an RSS value of the first and second transformed signals and output a real number sine/cosine wave basis function transformed signal.

12 Claims, 5 Drawing Sheets

(58) Field of Classification Search
CPC . G01S 13/0209; G01S 13/106; H04B 1/7183; H04B 1/71635; H04B 1/713; H04B 2001/71563; H04B 3/54; H04B 2203/542; H04B 2203/5466; H03L 7/18; H04L 1/08; H04L 27/2601; H04L 1/0068; H04L 1/0041; H04L 1/0054; H04L 1/0071; H04L 1/20; H04L 5/0046; H04L 5/006; H04L 27/0012; H04L 27/103; H04L 27/10; H04L 1/0045
USPC ........ 342/175, 159, 324; 375/355, 347, 329; 455/73; 708/75; 329/300
See application file for complete search history.

(56) References Cited

U.S. PATENT DOCUMENTS

| | | | |
|---|---|---|---|
| 2003/0112896 A1* | 6/2003 | Raghavan | H04L 27/2601 455/75 |
| 2003/0128783 A1* | 7/2003 | Richards | H03L 7/18 375/355 |
| 2010/0241009 A1* | 9/2010 | Petkie | G01S 7/35 342/147 |
| 2020/0155011 A1* | 5/2020 | Park | A61B 5/0507 |

OTHER PUBLICATIONS

Park et al. ("Arctangent Demodulation With DC Offset Compensation in Quadrature Doppler Radar Receiver Systems", IEEE Transactionson Microwave Theory and Techniques, vol. 55, No. 5, https://doi.org/10.1109/TMTT.2007.895653 (Year: 2007).*

Xu, W et al. âRobust Doppler Radar Demodulation via Compressed Sensing.â Electronics letters 48.22 (2012): 1428â1430. Web. (Year: 2012).*

Ju-Yin Shih et al., Quadrature Cosine Transform (QCT) With Varying Window Length (VWL) Technique for Noncontact Vital Sign Monitoring Using a Continuous-Wave (CW) Radar, IEEE Transactions on Microwave Theory and Techniques, Dec. 23, 2021.

* cited by examiner

REAL NUMBER SINE/COSINE WAVE BASIS FUNCTION TRANSFORM CIRCUIT

FIELD OF THE INVENTION

This invention generally relates to a transform circuit, and more particularly to a real number sine/cosine wave basis function transform circuit.

BACKGROUND OF THE INVENTION

FIG. 1 is a circuit diagram of a conventional Doppler radar. The Doppler radar transmits a transmit signal $S_{TX}(t)$ toward a human target and receives a reflected signal $S_d(t)$ from the human target. Movement of the human target with respect to the Doppler radar may induce the Doppler effect on the transmit signal $S_{TX}(t)$ and lead the reflected signal $S_d(t)$ containing phase shift caused by movement of the human target. Accordingly, movement information of the human target can be detected by phase demodulation of the reflected signal $S_d(t)$. Moreover, in order to resolve the null point issue, arctangent demodulation of IQ signals $S_I(t)$ and $S_Q(t)$, which are mutually orthogonal, is the common method of signal processing in the Doppler radar to extract information relative to Doppler phase modulation. The Doppler radar can not only detect movement of the human target, but also detect cardiopulmonary activities of the human target through Fourier analysis. Further, referring to FIG. 1, a receive antenna of the Doppler radar receives the reflected signal $S_d(t)$ from the human target and receives a clutter signal $S_C(t)$ reflected from a stationary object which creates dc offsets in signals received by the Doppler radar to lead decreased accuracy. For this reason, using dc offset calibration is necessary before arctangent demodulation, or using other complicated demodulation processes, such as non-iterative linear demodulation or complex signal demodulation, reduces computational efficiency.

SUMMARY

The object of the present invention is to provide a frequency spectrum transform technique using a real number sine/cosine wave basis function. Frequency resolution can be improved without complicated dc offset calibration to achieve great computational efficiency and accuracy.

One aspect of the present invention provides a real number sine/cosine wave basis function transform circuit which includes a window segmentation element, a first transform element, a second transform element and a root-sum-square (RSS) element. The window segmentation element is provided to receive and segment an in-phase output signal and a quadrature output signal to output an in-phase window signal and a quadrature window signal. The first transform element is electrically connected to the window segmentation element and a real number sine/cosine wave basis function generator to receive the in-phase window signal and a real number sine/cosine wave basis function output from the real number sine/cosine wave basis function generator. The first transform element is provided to multiply the in-phase window signal with the real number sine/cosine wave basis function, calculate an average of a first multiplication result of the in-phase window signal and the real number sine/cosine wave basis function and output a first transformed signal. The second transform element is electrically connected to the window segmentation element and the real number sine/cosine wave basis function generator to receive the quadrature window signal and the real number sine/cosine wave basis function output from the real number sine/cosine wave basis function generator. The second transform element is provided to multiply the quadrature window signal with the real number sine/cosine wave basis function, calculate an average of a second multiplication result of the quadrature window signal and the real number sine/cosine wave basis function and output a second transformed signal. The RSS element is electrically connected to the first and second transform elements to receive the first and second transformed signals. The RSS element is provided to calculate an RSS value of the first and second transformed signals and output a real number sine/cosine wave basis function transformed signal.

Transform processes of the in-phase window signal and the quadrature window signal are performed by the first and second transform elements using the real number sine/cosine wave basis function. Complicated dc offset calibration is unnecessary, so the transform circuit of the present invention can reduce computational complexity significantly and improve frequency resolution and estimation accuracy.

DETAILED DESCRIPTION OF THE INVENTION

Figure 2:
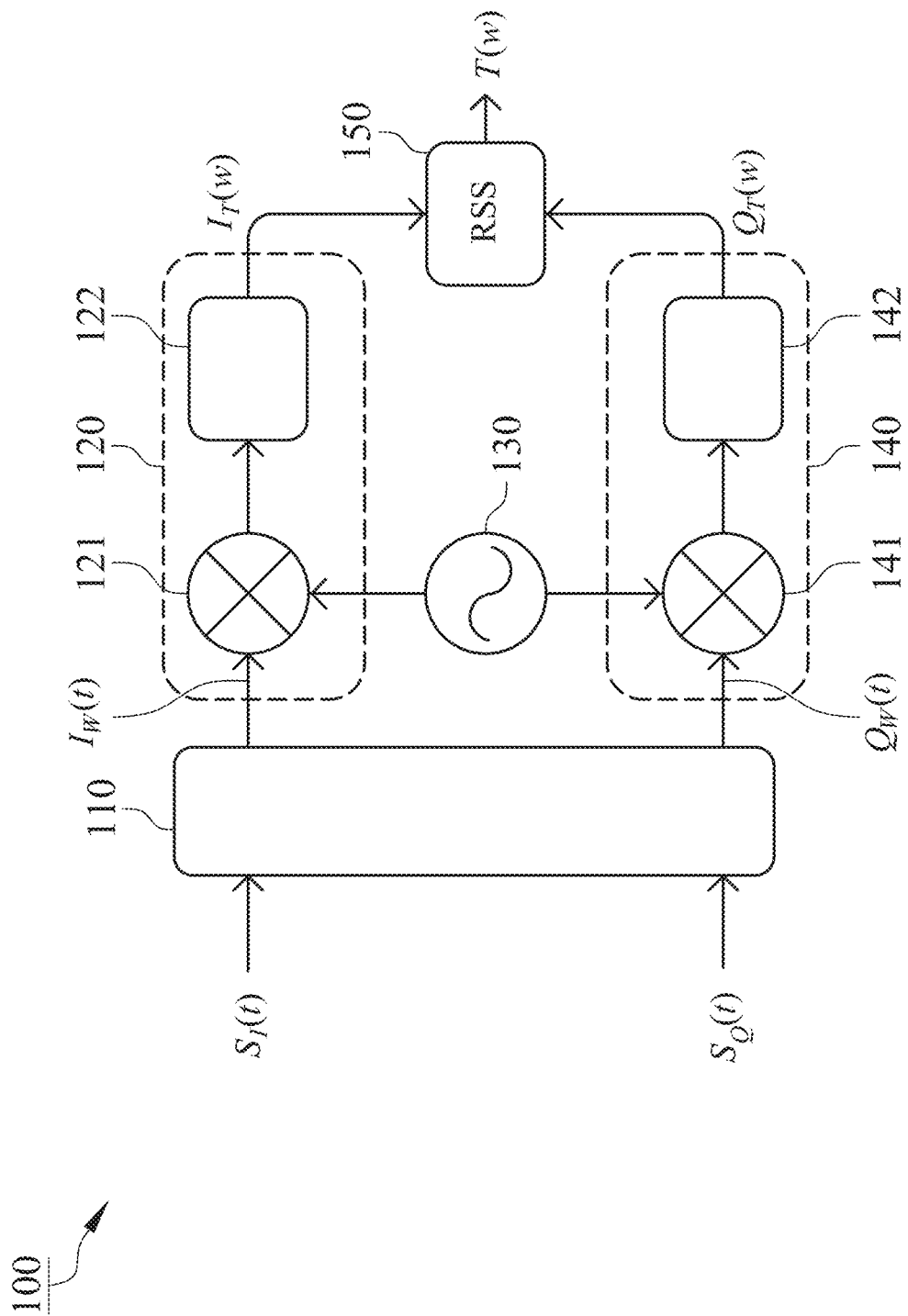
FIG. 2 is a circuit diagram illustrating a real number sine/cosine wave basis function transform circuit in accordance with a first embodiment of the present invention.

With reference to FIG. 2, a real number sine/cosine wave basis function transform circuit 100 in accordance with a first embodiment of the present invention includes a window segmentation element 110, a first transform element 120, a real number sine/cosine wave basis function generator 130, a second transform element 140 and a root-sum-square (RSS) element 150 which each may be a circuit composed of multiple electronic components or a computing step performed in a computer, so the invention is not limited to the only method.

Figure 1:
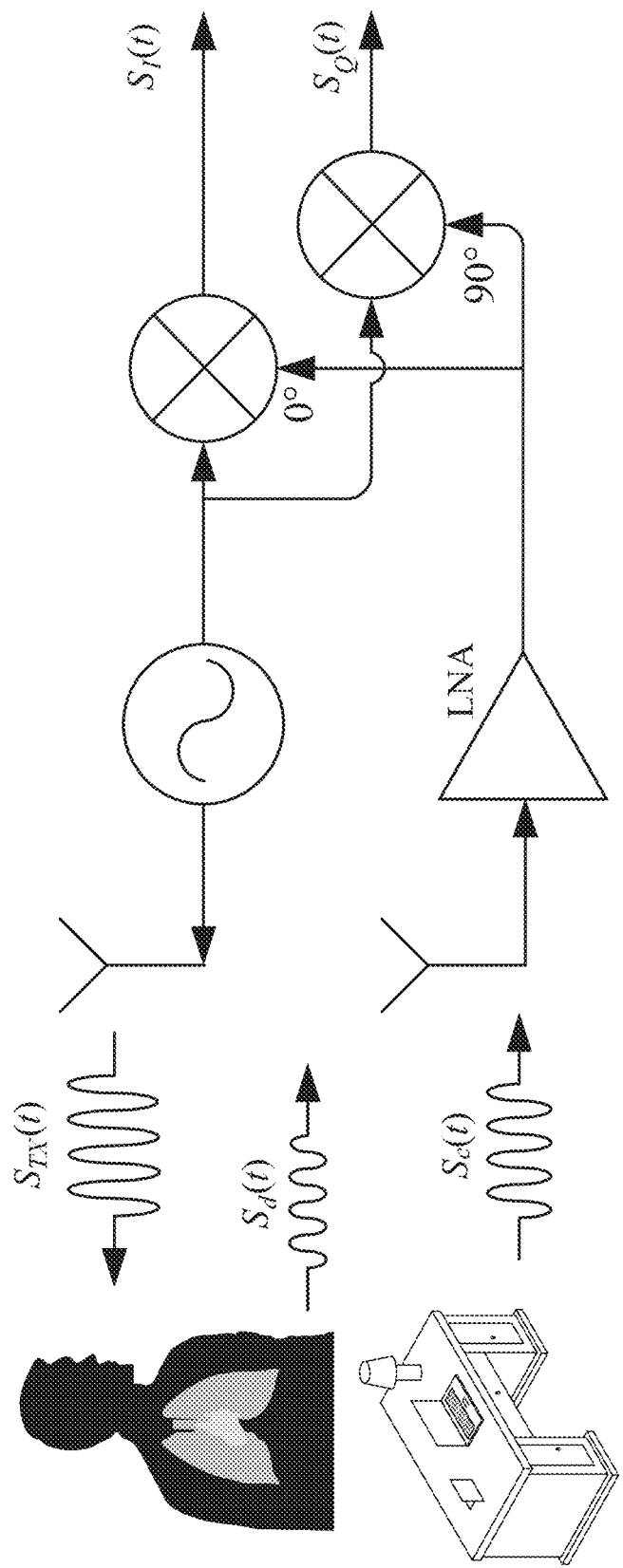
FIG. 1 is a circuit diagram illustrating a conventional Doppler radar.

The window segmentation element 110 can receive an in-phase output signal SAO and a quadrature output signal $S_Q(t)$ output from the conventional Doppler radar as shown in FIG. 1. The window segmentation element 110 is provided to divide the in-phase output signal SAO and output an in-phase window signal $I_W(t)$ to the first transform element 120, and the window segmentation element 110 is also provided to divide the quadrature output signal $S_Q(t)$ and output a quadrature window signal $Q_W(t)$ to the second transform element 140. After dividing the in-phase output signal SAO and the quadrature output signal $S_Q(t)$ into the in-phase window signal $I_W(t)$ and the quadrature window signal $Q_W(t)$ by the window segmentation element 110, the phase difference between one of the in-phase window signal $I_W(t)$ and the quadrature window signal $Q_W(t)$ with a larger amplitude and a real number sine/cosine wave basis function which is output from the real number sine/cosine wave basis function generator 130 is 0 or 180 degrees, and a correct normalized spectrum can be obtained after signal transformation by the first transform element 120 or the second transform element 140.

Signal transformation is performed using only the real number sine/cosine wave basis function in this embodiment, so the phase difference between the in-phase output signal SAO and the real number sine/cosine wave basis function and the phase difference between the quadrature output signal $S_Q(t)$ and the real number sine/cosine wave basis function may be 90 degrees. At this time, the energy of the correct frequency is decreased closely to zero and target's vibration frequency cannot be determined based on peak frequency. Thus, the window segmentation element 110 is provided to process the in-phase output signal SAO and the quadrature output signal $S_Q(t)$ in advance in this embodiment to avoid spectrum error.

The first transform element 120 is electrically connected to the window segmentation element 110 and the real number sine/cosine wave basis function generator 130. The first transform element 120 receives the in-phase window signal $I_W(t)$ and a real number sine/cosine wave basis function output from the real number sine/cosine wave basis function generator 130. The first transform element 120 is employed to multiply the in-phase window signal $I_W(t)$ with the real number sine/cosine wave basis function first, and calculate its average to output a first transformed signal $I_T(w)$. Preferably, the real number sine/cosine wave basis function output from the real number sine/cosine wave basis function generator 130 is a real number sine function or a real number cosine function. In this embodiment, transformation of the in-phase window signal $I_W(t)$ from time domain to frequency domain is performed using only the real number sine function or the real number cosine function. Compared to the conventional Fourier transform using complex exponential basis function including sine function and cosine function, the transformation performed in this embodiment can improve resolution of the spectrum of the in-phase window signal $I_W(t)$ twice. Moreover, due to the proper window segmentation using the window segmentation element 110, the in-phase window signal $I_W(t)$ or the quadrature window signal $Q_W(t)$, which has a greater amplitude, has a phase difference of 0 or 180 degrees with respect to the real number sine/cosine wave basis function to avoid deteriorated spectrum.

In this embodiment, the first transform element 120 includes a first multiplier 121 and a third average calculator 122. The first multiplier 121 is electrically connected to the window segmentation element 110 and the real number sine/cosine wave basis function generator 130 to receive the in-phase window signal $I_W(t)$ and the real number sine/cosine wave basis function. The first multiplier 121 is used to multiply the in-phase window signal $I_W(t)$ with the real number sine/cosine wave basis function to generate a first multiplied signal. The third average calculator 122 is electrically connected to the first multiplier 121 to receive the first multiplied signal, and the third average calculator 122 calculates the average of the first multiplied signal and output the first transformed signal $I_T(w)$.

The second transform element 140 is electrically connected to the window segmentation element 110 and the real number sine/cosine wave basis function generator 130 to receive the quadrature window signal $Q_W(t)$ and the real number sine/cosine wave basis function output from the real number sine/cosine wave basis function generator 130. After multiplying the quadrature window signal $Q_W(t)$ with the real number sine/cosine wave basis function, the second transform element 140 calculates its average and output a second transformed signal $Q_T(w)$. Likewise, the quadrature window signal $Q_W(t)$ is transformed from time domain to frequency domain using only the real number sine function or the real number cosine function, and the transform performed in this embodiment also can improve resolution of the spectrum of the quadrature window signal $Q_W(t)$ twice compared to the conventional Fourier transform using complex exponential basis function including sine and cosine functions.

The second transform element 140 of this embodiment includes a second multiplier 141 and a fourth average calculator 142. The second multiplier 141 is electrically connected to the window segmentation element 110 and the real number sine/cosine wave basis function generator 130 to receive the quadrature window signal $Q_W(t)$ and the real number sine/cosine wave basis function. The second multiplier 141 is provided to multiply the quadrature window signal $Q_W(t)$ with the real number sine/cosine wave basis function to generate a second multiplied signal. The fourth average calculator 142 is electrically connected to the second multiplier 141 to receive the second multiplied signal, and the fourth average calculator 142 calculates an average of the second multiplied signal and output the second transformed signal $Q_T(w)$.

If the real number sine/cosine wave basis function is a real number cosine function, the window segmentation element 110 compares amplitudes of the in-phase output signal SAO and the quadrature output signal $S_Q(t)$, and one of them having a greater amplitude is used as a decision signal. Next, the window segmentation element 110 calculates absolute value of the decision signal, defines one peak point of the absolute value of the decision signal as a beginning point and defines the point at the (1+2n)th peak after the beginning point as an end point, thereby dividing the in-phase output signal SAO and the quadrature output signal $S_Q(t)$ into the in-phase window signal $I_W(t)$ and the quadrature window signal $Q_W(t)$ respectively, where n is a positive integer. Due to the maximum of the absolute value of the in-phase output signal SAO or the quadrature output signal $S_Q(t)$ is the limit (peak or valley) and the real number cosine function has the maximum amplitude when t=0, one of the in-phase window signal $I_W(t)$ and the quadrature window signal $Q_W(t)$ with a larger amplitude has a phase difference of 0 or 180 degrees with respect to the real number cosine function so as to acquire accurate transformed spectrum. Although the other signal with a smaller amplitude has a phase difference of 90 or 270 degrees with respect to the real number cosine function after window segmentation, it has a minor influence on the spectrum because of its smaller amplitude.

While a real number sine function is used for signal transformation, the in-phase output signal SAO and the quadrature output signal $S_Q(t)$ are compared in amplitude by the window segmentation element 110, and one of them having a greater amplitude is defined as a decision signal. After that, the window segmentation element 110 calculates absolute value of the decision signal, defines one valley point of the absolute value of the decision signal as a beginning point and defines the point at the (1+2n)th valley after the beginning point as an end point, thereby cutting the in-phase output signal SAO and the quadrature output signal $S_Q(t)$ into the in-phase window signal $I_W(t)$ and the quadrature window signal $Q_W(t)$ respectively, where n is a positive integer. The valley of the absolute value of the in-phase output signal $S_I(t)$ or the quadrature output signal $S_Q(t)$ is equal to zero and the amplitude of the real number sine function is zero when t=0, consequently, after window segmentation, one of the in-phase window signal $I_W(t)$ and the quadrature window signal $Q_W(t)$ with a larger amplitude has a phase difference of 0 or 180 degrees with respect to the real number sine function so as to avoid error in frequency spectrum transformation.

The window segmentation mentioned above is used in this embodiment, not limit to the present invention. In other embodiments, the in-phase output signal SAO and the quadrature output signal $S_Q(t)$ can be processed by different window segmentation method to allow one of the in-phase window signal $I_W(t)$ and the quadrature window signal $Q_W(t)$ with a larger amplitude to have a phase difference of 0 or 180 degrees with respect to the real number sine function.

With reference to FIG. 2, the RSS element 150 is electrically connected to the first transform element 120 and the second transform element 140 to receive the first transformed signal $I_T(w)$ and the second transformed signal $Q_T(w)$. The RSS element 150 calculates a root-sum-square (RSS) value of the first transformed signal $I_T(w)$ and the second transformed signal $Q_T(w)$ and output a real number sine/cosine wave basis function transformed signal T(w). In this embodiment, the RSS element 150 is employed for spectrum superposition of the first transformed signal $I_T(w)$ and the second transformed signal $Q_T(w)$ so as to achieve excellent spectrum resolution, resolve null point problem and further improve frequency estimation accuracy. The real number sine/cosine wave basis function transformed signal T(w) is a spectrum of vibration frequency of a target, and the target's vibration displacement is less than 1/16 wavelength ($\lambda/16$) of the in-phase output signal SAO and the quadrature output signal $S_Q(t)$, this limitation is necessary for the small-angle approximation to avoid distortion.

Figure 3:
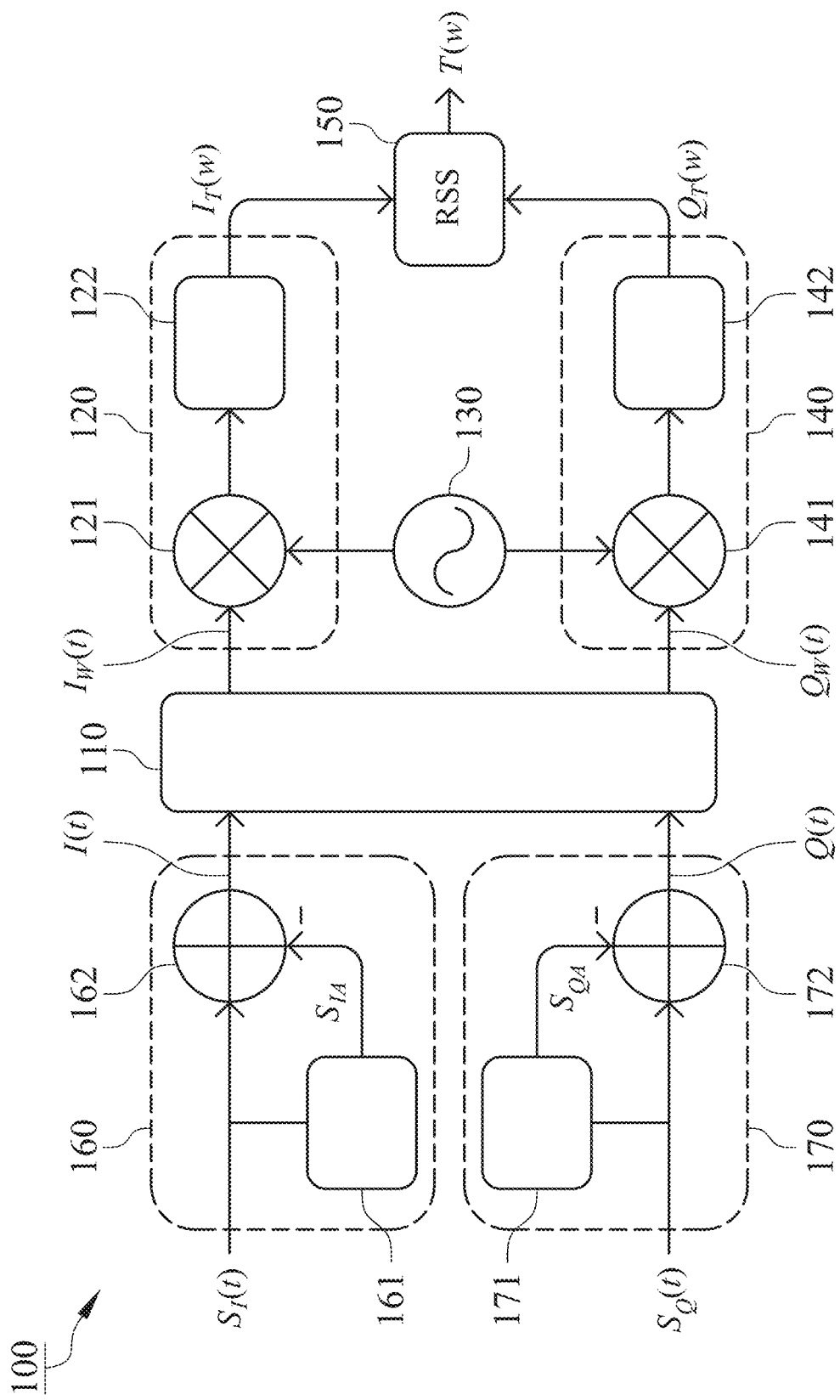
FIG. 3 is a circuit diagram illustrating a real number sine/cosine wave basis function transform circuit in accordance with a second embodiment of the present invention.

FIG. 3 is a circuit diagram showing a second embodiment of the present invention. Different to the first embodiment, the real number sine/cosine wave basis function transform circuit 100 of the second embodiment further includes a first dc-offset element 160 and a second dc-offset calculation element 170. While the vibration frequency of the target detected by radar is near zero, for example, while respiration frequency detected by vital sign radar is less than 0.4 Hz or heartbeat frequency detected by vital sign radar is less than 3 Hz, it is difficult to distinguish vital signs from the spectrum due to the dc offsets. For this reason, the first dc-offset element 160 and the second dc-offset element 170 are required to calibrate dc offsets in the in-phase output signal $S_I(t)$ and the quadrature output signal $S_Q(t)$.

The first dc-offset element 160 receives the in-phase output signal SAO, calibrates dc offsets in the in-phase output signal SAO and output an in-phase signal I(t) to the window segmentation element 110. In the second embodiment, the first dc-offset element 160 includes a first average calculator 161 and a first subtractor 162. The first average calculator 161 receives and calculates an average of the in-phase output signal $S_I(t)$ and output an in-phase average signal $S_{IA}$. The first subtractor 162 is electrically connected to the first average calculator 161 to receive the in-phase average signal $S_{IA}$ and the in-phase output signal $S_I(t)$, and the first subtractor 162 is used to subtract the in-phase average signal $S_{IA}$ from the in-phase output signal $S_I(t)$ and output the in-phase signal/(t) to the window segmentation element 110. The first dc-offset element 160 can eliminate dc offsets in the in-phase output signal $S_I(t)$ by minus the average.

The second dc-offset element 170 receives the quadrature output signal $S_Q(t)$, calibrates dc offsets in the quadrature output signal $S_Q(t)$ and output a quadrature signal Q(t) to the window segmentation element 110. The second dc-offset element 170 of the second embodiment includes a second average calculator 171 and a second subtractor 172. The second average calculator 171 receives the quadrature output signal $S_Q(t)$, calculates an average of the quadrature output signal $S_Q(t)$ and output a quadrature average signal $S_{QA}$. The second subtractor 172 is electrically connected to the second average calculator 171 to receive the quadrature average signal $S_{QA}$ and the quadrature output signal $S_Q(t)$. The second subtractor 172 is used to subtract the quadrature average signal $S_{QA}$ from the quadrature output signal $S_Q(t)$ and output the quadrature signal Q(t) to the window segmentation element 110. After removing the average, dc offsets in the quadrature output signal $S_Q(t)$ is eliminated by the second dc-offset element 170.

Referring to FIG. 3, the window segmentation element 110 receives and cut the in-phase signal I(t) and the quadrature signal Q(t) so as to output the in-phase window signal $I_W(t)$ and the quadrature window signal $Q_W(t)$, respectively. The architecture and operation of the first transform element 120, the second transform element 140 and the RSS element 150 of the second embodiment are identical to those of the first embodiment, so not repeat here.

Figure 4:
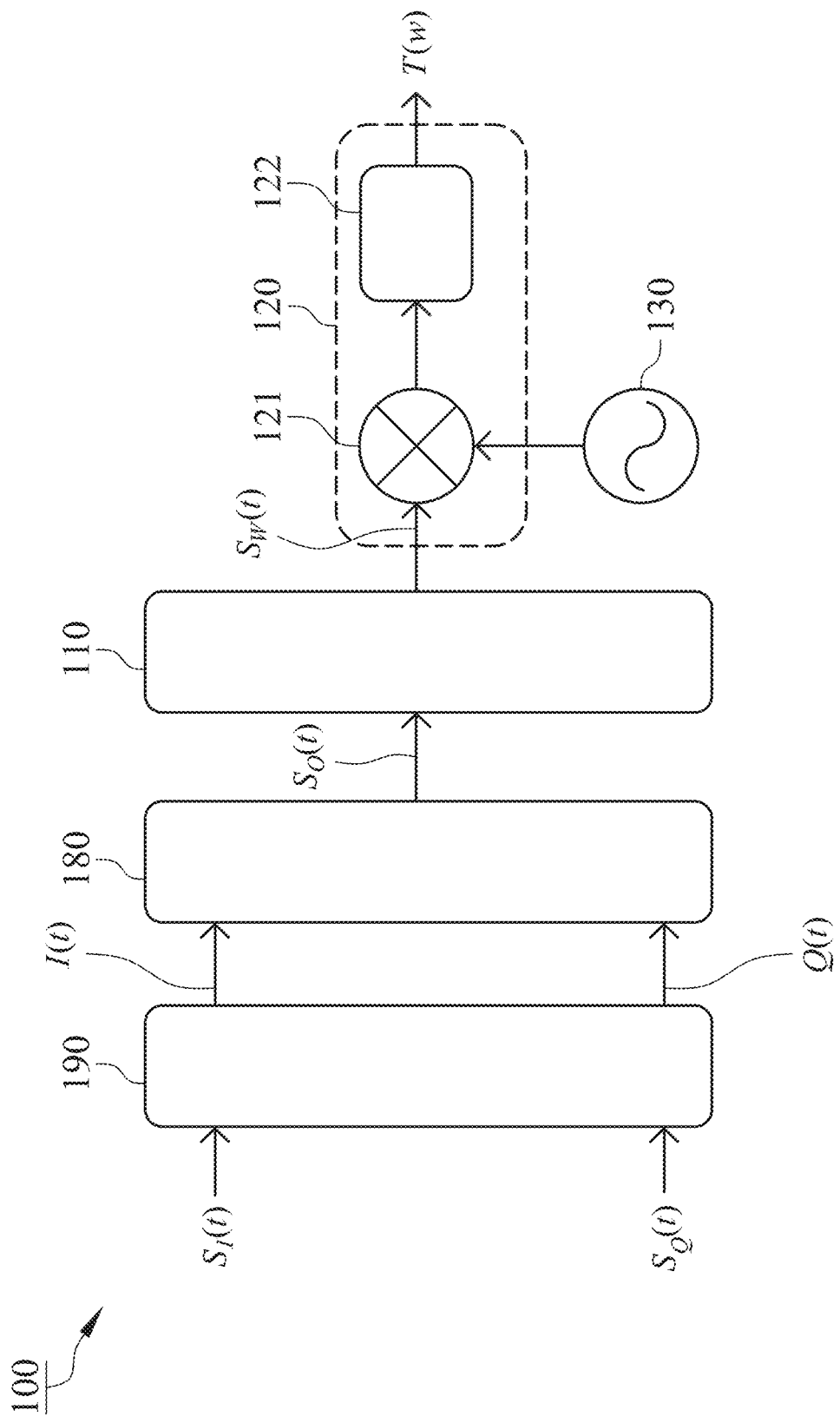
FIG. 4 is a circuit diagram illustrating a real number sine/cosine wave basis function transform circuit in accordance with a third embodiment of the present invention.

A third embodiment of the present invention is shown as FIG. 4. The difference between the first and third embodiments is that the window segmentation element 110 in the third embodiment receives output signal from only one path, so the third embodiment is a transform circuit with single channel. The real number sine/cosine wave basis function transform circuit 100 of the third embodiment includes a window segmentation element 110, a first transform element 120 and a real number sine/cosine wave basis function generator 130. The window segmentation element 110 receives an output signal $S_Q(t)$ from an arctangent demodulation element 180, segment the output signal $S_Q(t)$ and then output a window signal $S_W(t)$. The first transform element 120 is electrically connected to the window segmentation element 110 and the real number sine/cosine wave basis function generator 130. The first transform element 120 receives the window signal $S_W(t)$ and a real number sine/cosine wave basis function output from the real number sine/cosine wave basis function generator 130, multiplies the window signal $S_W(t)$ with the real number sine/cosine wave basis function, and calculate its average, and output a real number sine/cosine wave basis function transformed signal T(w). Identical to other embodiments, the real number sine/cosine wave basis function in this embodiment is a real number sine function or a real number cosine function. Because of the arctangent demodulation element 180, only one channel needs to be transformed, thus the transform circuit of this embodiment can be used to detect a moving target with a displacement greater than $\lambda/16$.

Further referring to FIG. 4, if the vibration frequency of the target is small, dc-offset calibration is required before arctangent demodulation proceeded by the arctangent demodulation element 180. In this embodiment, the in-phase output signal $S_I(t)$ and the quadrature output signal $S_Q(t)$ are received by a dc-offset calibration element 190. The dc-offset calibration element 190 is provided to remove dc offsets in the in-phase output signal SAO and the quadrature output signal $S_Q(t)$ by complicated dc offset calibration method, such as iteration or geometric method, to obtain the in-phase signal I(t) and the quadrature signal Q(t). The arctangent demodulation element 180 is electrically connected to the dc-offset calibration element 190 to receive the in-phase signal I(t) and the quadrature signal Q(t), and the arctangent demodulation element 180 arctangent-demodulates the in-phase signal I(t) and the quadrature signal Q(t) to obtain the output signal $S_O(t)$. In other embodiment, as the vibration frequency of the target is large, the dc-offset calibration element 190 is not required and the arctangent demodulation element 180 can arctangent-demodulate the in-phase output signal SAO and the quadrature output signal $S_Q(t)$ directly to output the output signal $S_O(t)$ to the window segmentation element 110.

Figure 5A:
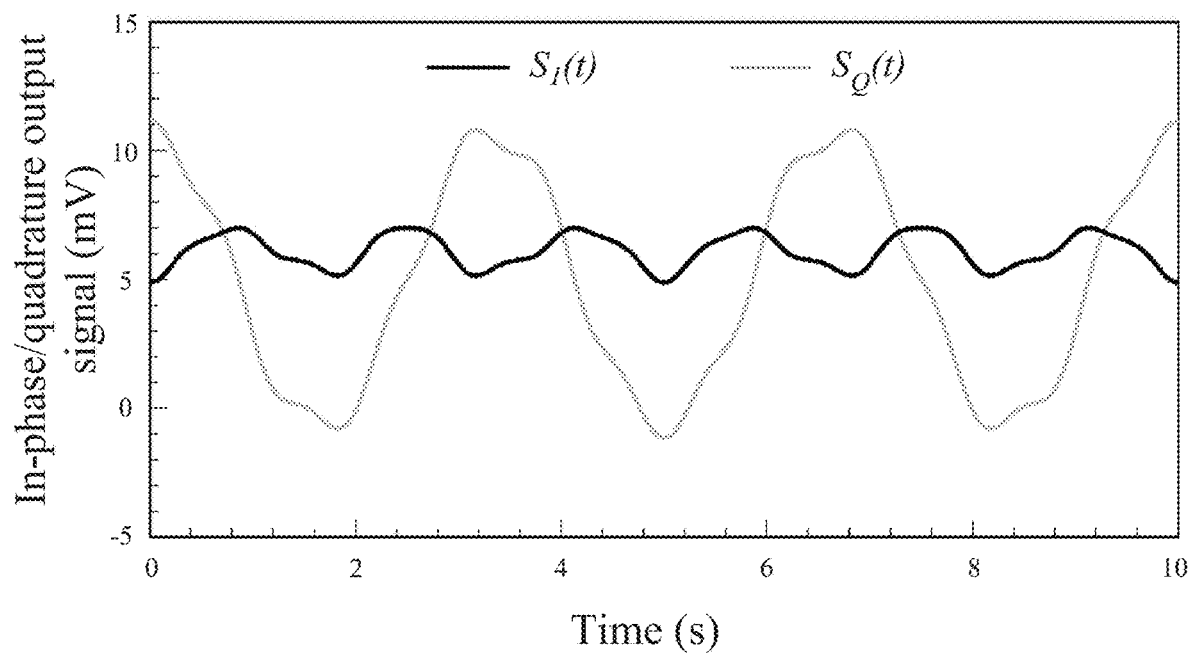
FIG. 5a is a waveform diagram of simulated in-phase output signal and quadrature output signal.
Figure 5B:
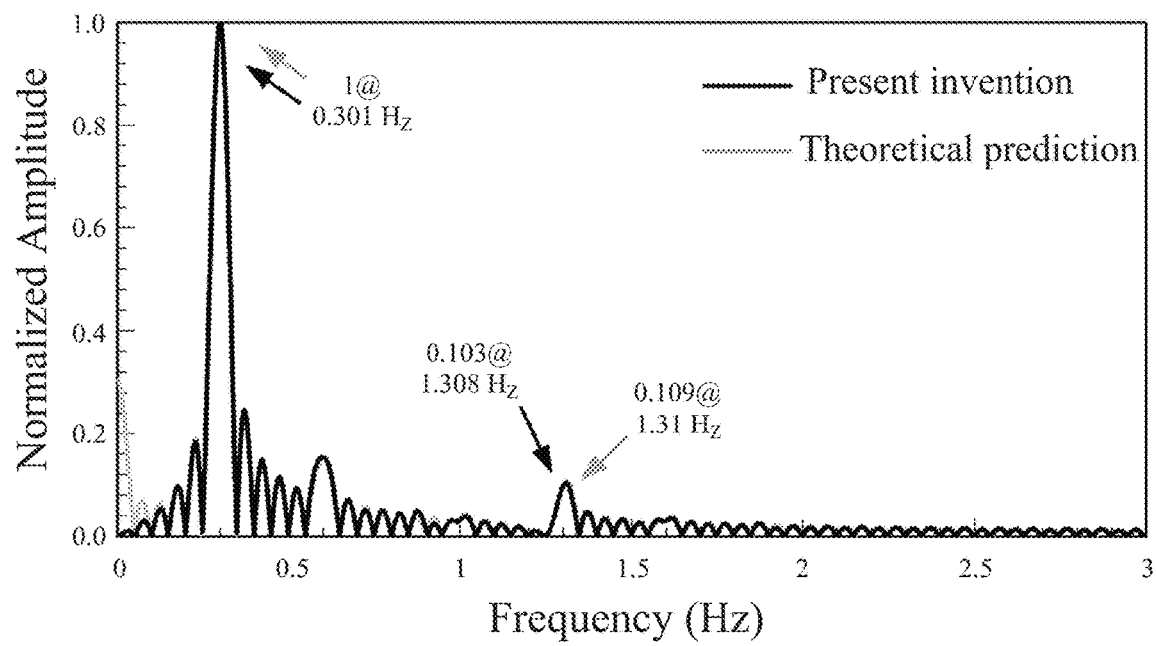
FIG. 5b is a comparison diagram of theoretical prediction and transformed spectrum obtained by transforming simulated in-phase output signal and quadrature output signal using the real number sine/cosine wave basis function transform circuit in accordance with the second embodiment of the present invention.

FIG. 5a is a waveform diagram of simulated in-phase output signal SAO and quadrature output signal $S_Q(t)$, and FIG. 5b is a comparison diagram of theoretical predictions and the real number sine/cosine wave basis function transformed signal T(w) obtained by transforming simulated in-phase output signal $S_I(t)$ and quadrature output signal $S_Q(t)$ using the transform circuit of the second embodiment of the present invention, a real number cosine function is used in simulation. Theoretical predictions and simulated results are in excellent agreement, demonstrates that accuracy spectrum can be acquired using the real number sine/cosine wave basis function transform circuit 100 of the present invention without the need of complicated dc-offset calibration method.

The first transform element 120 and the second transform element 140 of the present invention are provided for transform of the in-phase window signal $I_W(t)$ and the quadrature window signal $Q_W(t)$ using the real number sine/cosine wave basis function. Signal transform is operable without complicated dc offset calibration so the present invention can reduce computational load and improve frequency resolution and estimation accuracy significantly.

The scope of the present invention is only limited by the following claims. Any alternation and modification without departing from the scope and spirit of the present invention will become apparent to those skilled in the art.

What is claimed is:

1. A real number sine/cosine wave basis function transform circuit comprising:
    a window segmentation element configured to receive an in-phase output signal and a quadrature output signal, and configured to segment the in-phase output signal and the quadrature output signal and output an in-phase window signal and a quadrature window signal, respectively, wherein the window segmentation element is configured to compare amplitudes of the in-phase output signal and the quadrature output signal, one of the in-phase output signal and the quadrature output signal having a larger amplitude is configured to be used as a decision signal, the window segmentation element is configured to calculate absolute value of the decision signal, define one peak point of the absolute value of the decision signal as a beginning point, define a point at a (1+2n)th peak after the beginning point as an end point, and segment the in-phase output signal and the quadrature output signal into the in-phase window signal and the quadrature window signal, where n is a positive integer;
    a first transform element electrically connected to the window segmentation element and a real number sine/cosine wave basis function generator to receive the in-phase window signal and a real number sine/cosine wave basis function output from the real number sine/cosine wave basis function generator, the first transform element is configured to multiply the in-phase window signal with the real number sine/cosine wave basis function, calculate an average of a first multiplication result of the in-phase window signal and the real number sine/cosine wave basis function, and output a first transformed signal;
    a second transform element electrically connected to the window segmentation element and the real number sine/cosine wave basis function generator to receive the quadrature window signal and the real number sine/cosine wave basis function output from the real number sine/cosine wave basis function generator, the second transform element is configured to multiply the quadrature window signal with the real number sine/cosine wave basis function, calculate an average of a second multiplication result of the quadrature window signal and the real number sine/cosine wave basis function, and output a second transformed signal, wherein the real number sine/cosine wave basis function output from the real number sine/cosine wave basis function generator is a real number cosine function, one of the in-phase window signal and the quadrature window signal with a larger amplitude to have a phase difference of 0 or 180 degrees with respect to the real number cosine wave function; and
    a root-sum-square (RSS) element electrically connected to the first and second transform elements to receive the first and second transformed signals, the RSS element is configured to calculate a root-sum-square value of the first and second transformed signals and output a real number sine/cosine wave basis function transformed signal.

2. The real number sine/cosine wave basis function transform circuit in accordance with claim 1 further comprising a first dc-offset element and a second dc-offset element, wherein the first dc-offset element is configured to receive the in-phase output signal, calibrate dc offsets in the in-phase output signal and output an in-phase signal, the second dc-offset element is configured to receive the quadrature output signal, calibrate dc offsets in the quadrature output signal and output a quadrature signal, the window segmentation element is configured to receive the in-phase signal and the quadrature signal, and configured to segment the in-phase signal and the quadrature signal and output the in-phase window signal and the quadrature window signal, respectively.

3. The real number sine/cosine wave basis function transform circuit in accordance with claim 2, wherein the first dc-offset element includes a first average calculator and a first subtractor, the first average calculator is configured to receive the in-phase output signal and output an in-phase average signal, the first subtractor is electrically connected to the first average calculator, the first subtractor is configured to receive the in-phase average signal and the in-phase output signal, subtract the in-phase average signal from the in-phase output signal and output the in-phase signal.

4. The real number sine/cosine wave basis function transform circuit in accordance with claim 3, wherein the second dc-offset element includes a second average calculator and a second subtractor, the second average calculator is configured to receive the quadrature output signal and output a quadrature average signal, the second subtractor is electrically connected to the second average calculator, the second subtractor is configured to receive the quadrature average signal and the quadrature output signal, subtract the quadrature average signal from the quadrature output signal and output the quadrature signal.

5. The real number sine/cosine wave basis function transform circuit in accordance with claim 1, wherein the first transform element includes a first multiplier and a third average calculator, the first multiplier is electrically connected to the window segmentation element and the real number sine/cosine wave basis function generator to receive the in-phase window signal and the real number sine/cosine wave basis function, the first multiplier is configured to multiply the in-phase window signal with the real number sine/cosine wave basis function to obtain a first multiplied signal, the third average calculator is electrically connected to the first multiplier to receive the first multiplied signal, and the third average calculator is configured to output the first transformed signal.

6. The real number sine/cosine wave basis function transform circuit in accordance with claim 5, wherein the second transform element includes a second multiplier and a fourth average calculator, the second multiplier is electrically connected to the window segmentation element and the real number sine/cosine wave basis function generator to receive the quadrature window signal and the real number sine/cosine wave basis function, the second multiplier is configured to multiply the quadrature window signal with the real number sine/cosine wave basis function to obtain a second multiplied signal, the fourth average calculator is electrically connected to the second multiplier to receive the second multiplied signal, and the fourth average calculator is configured to output the second transformed signal.

7. The real number sine/cosine wave basis function transform circuit in accordance with claim 1, wherein the real number sine/cosine wave basis function transformed signal is a spectrum of vibration frequency of a target, and a vibration displacement of the target is less than $\frac{1}{16}$ wavelength of the in-phase output signal and the quadrature signal.

8. A real number sine/cosine wave basis function transform circuit comprising:
a window segmentation element configured to receive and segment an output signal and output a window signal, wherein the window segmentation element is configured to calculate absolute value of the output signal as a beginning point, define a point at a (1+2n)th peak after the beginning point as an end point, and segment the output signal into the window signal, where n is a positive integer; and
a transform element electrically connected to the window segmentation element and a real number sine/cosine wave basis function generator, the transform element is configured to receive the window signal and a real number sine/cosine wave basis function output from the real number sine/cosine wave basis function generator, and the transform element is configured to multiply the window signal with the real number sine/cosine wave basis function, calculate an average of a multiplication result of the window signal and the real number sine/cosine wave basis function, and output a real number sine/cosine wave basis function transformed signal, wherein the real number sine/cosine wave basis function output from the real number sine/cosine wave basis function generator is a real number cosine function, and the window signal has a phase difference of 0 or 180 degrees with respect to the real number cosine wave function.

9. The real number sine/cosine wave basis function transform circuit in accordance with claim 8 further comprising an arctangent demodulation element which is electrically connected to the window segmentation element, wherein the arctangent demodulation element is configured to receive and arctangent-demodulate an in-phase output signal and a quadrature output signal and configured to output the output signal to the window segmentation element.

10. The real number sine/cosine wave basis function transform circuit in accordance with claim 9 further comprising a dc-offset calibration element, wherein the dc-offset calibration element is configured to receive the in-phase output signal and the quadrature output signal, calibrate dc offsets in the in-phase output signal and quadrature output signal, and output an in-phase signal and a quadrature signal, the arctangent demodulation element is electrically connected to the dc-offset calibration element to receive the in-phase signal and the quadrature signal, and the arctangent demodulation element is configured to arctangent-demodulate the in-phase signal and the quadrature signal and output the output signal to the window segmentation element.

11. The real number sine/cosine wave basis function transform circuit in accordance with claim 8, wherein the transform element includes a multiplier and an average calculator, the multiplier is electrically connected to the window segmentation element and the real number sine/cosine wave basis function generator to receive the window signal and the real number sine/cosine wave basis function, the multiplier is configured to multiply the window signal with the real number sine/cosine wave basis function to obtain a multiplied signal, the average calculator is electrically connected to the multiplier to receive the multiplied signal, and the average calculator is configured to output the real number sine/cosine wave basis function transformed signal.

12. A real number sine/cosine wave basis function transform circuit comprising:
a window segmentation element configured to receive an in-phase output signal and a quadrature output signal, and configured to segment the in-phase output signal and the quadrature output signal and output an in-phase window signal and a quadrature window signal, respectively, wherein the window segmentation element is configured to compare amplitudes of the in-phase output signal and the quadrature output signal, one of the in-phase output signal and the quadrature output signal having a larger amplitude is configured to be used as a decision signal, the window segmentation element is configured to calculate absolute value of the decision signal, define one valley point of the absolute value of the decision signal as a beginning point, define the point at the (1+2n)th valley after the beginning point as an end point, and segment the in-phase output signal and the quadrature output signal into the in-phase window signal and the quadrature window signal, where n is a positive integer;
a first transform element electrically connected to the window segmentation element and a real number sine/cosine wave basis function generator to receive the in-phase window signal and a real number sine/cosine wave basis function output from the real number sine/cosine wave basis function generator, the first transform element is configured to multiply the in-phase window signal with the real number sine/cosine wave basis function, calculate an average of a first multiplication result of the in-phase window signal and the real number sine/cosine wave basis function, and output a first transformed signal;

a second transform element electrically connected to the window segmentation element and the real number sine/cosine wave basis function generator to receive the quadrature window signal and the real number sine/cosine wave basis function output from the real number sine/cosine wave basis function generator, the second transform element is configured to multiply the quadrature window signal with the real number sine/cosine wave basis function, calculate an average of a second multiplication result of the quadrature window signal and the real number sine/cosine wave basis function, and output a second transformed signal, wherein the real number sine/cosine wave basis function output from the real number sine/cosine wave basis function generator is a real number sine function, one of the in-phase window signal and the quadrature window signal with a larger amplitude to have a phase difference of 0 or 180 degrees with respect to the real number sine function; and a root-sum-square (RSS) element electrically connected to the first and second transform elements to receive the first and second transformed signals, the RSS element is configured to calculate a root-sum-square value of the first and second transformed signals and output a real number sine/cosine wave basis function transformed signal.

* * * * *